Dec. 8, 1931. J. W. BRYCE ET AL 1,835,373
TIME CONTROLLED ACCOUNTING MACHINE
Filed June 26, 1925 3 Sheets-Sheet 3
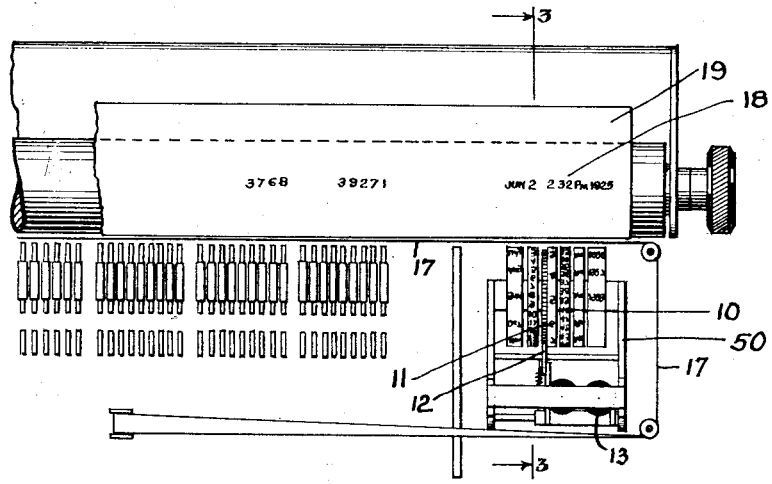
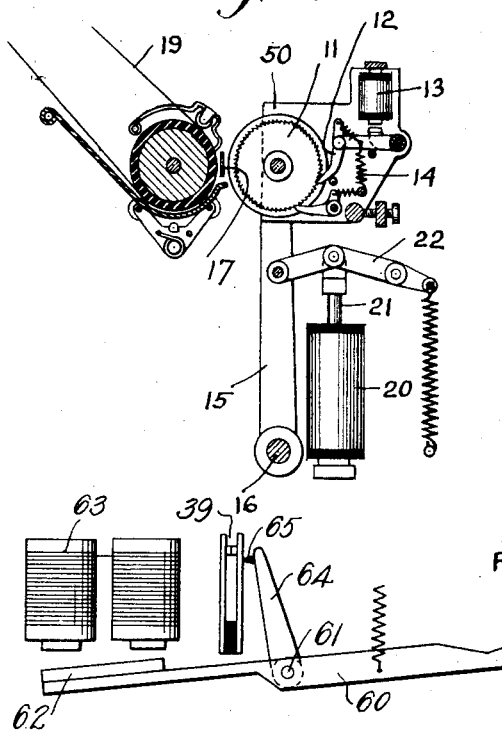
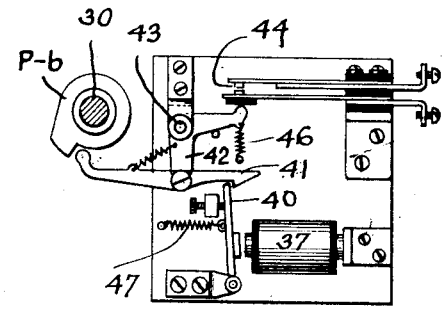
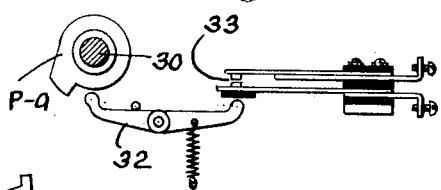

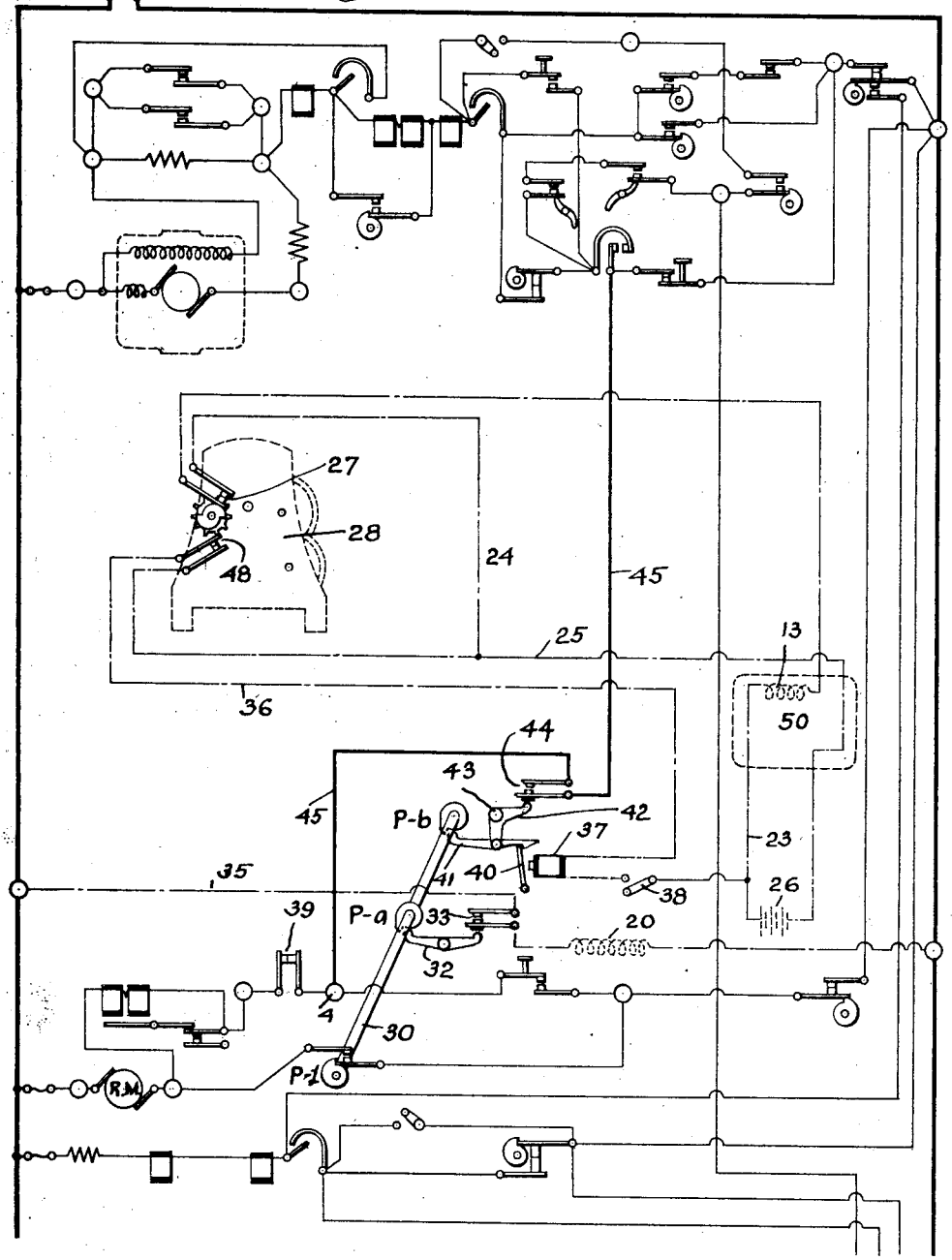

Patented Dec. 8, 1931

1,835,373

UNITED STATES PATENT OFFICE

JAMES W. BRYCE, OF BLOOMFIELD, NEW JERSEY, AND FELIX THOMAS, OF NEW YORK, N. Y., ASSIGNORS TO THE TABULATING MACHINE COMPANY, OF ENDICOTT, NEW YORK, A CORPORATION OF NEW JERSEY

TIME-CONTROLLED ACCOUNTING MACHINE

Application filed June 26, 1925. Serial No. 39,633.

The present invention is directed to improvements in controlling devices for accounting machines such as tabulating machines and the like.

One of the objects of the present invention resides in the provision of time controlled means for initiating or otherwise effecting the taking of a total or totals by an accounting machine.

A further object of the present invention resides in the provision of a device for taking a time record with the total record in order to distinctively show upon the record the time when the total was taken. This time record may, if desired, show the time of day, day of month, day of week, a. m. or p. m. and the like.

A further object of the present invention resides in the provision of means for automatically making the time record at the time a total or totals are taken by the accounting machine.

A further object of the present invention resides in the provision of means for taking a total or totals in an accounting machine which means operates entirely independent of the operation of tabulating or accounting machine. Provision is made for preventing the taking of totals at improper times, for example, at such times when the accounting machine is performing registering operations. Further provision is made for preventing repeated total taking operations under the initiation of the clock device. Provision is further made for preventing subsequent total taking operations until the accounting machine has carried out further operations such as registering.

In the drawings,

Figs. 1 and 1a taken together show the circuit diagram of the machine.

Fig. 2 shows a top plan view of a portion of the printing unit with the time stamp in association therewith.

Fig. 3 is a detail sectional view of the time stamping unit, the section being taken on line 3—3 of Fig. 2.

Fig. 4 is a detail view of one of the contact controlling devices of the machine.

Fig. 5 is an enlarged detail view of the cam contact device which initiates a time printing operation from the reset and total printing cycle of the machine.

Fig. 6 is a detail view of a contact controlled by the card feed clutch.

Figure 1A:
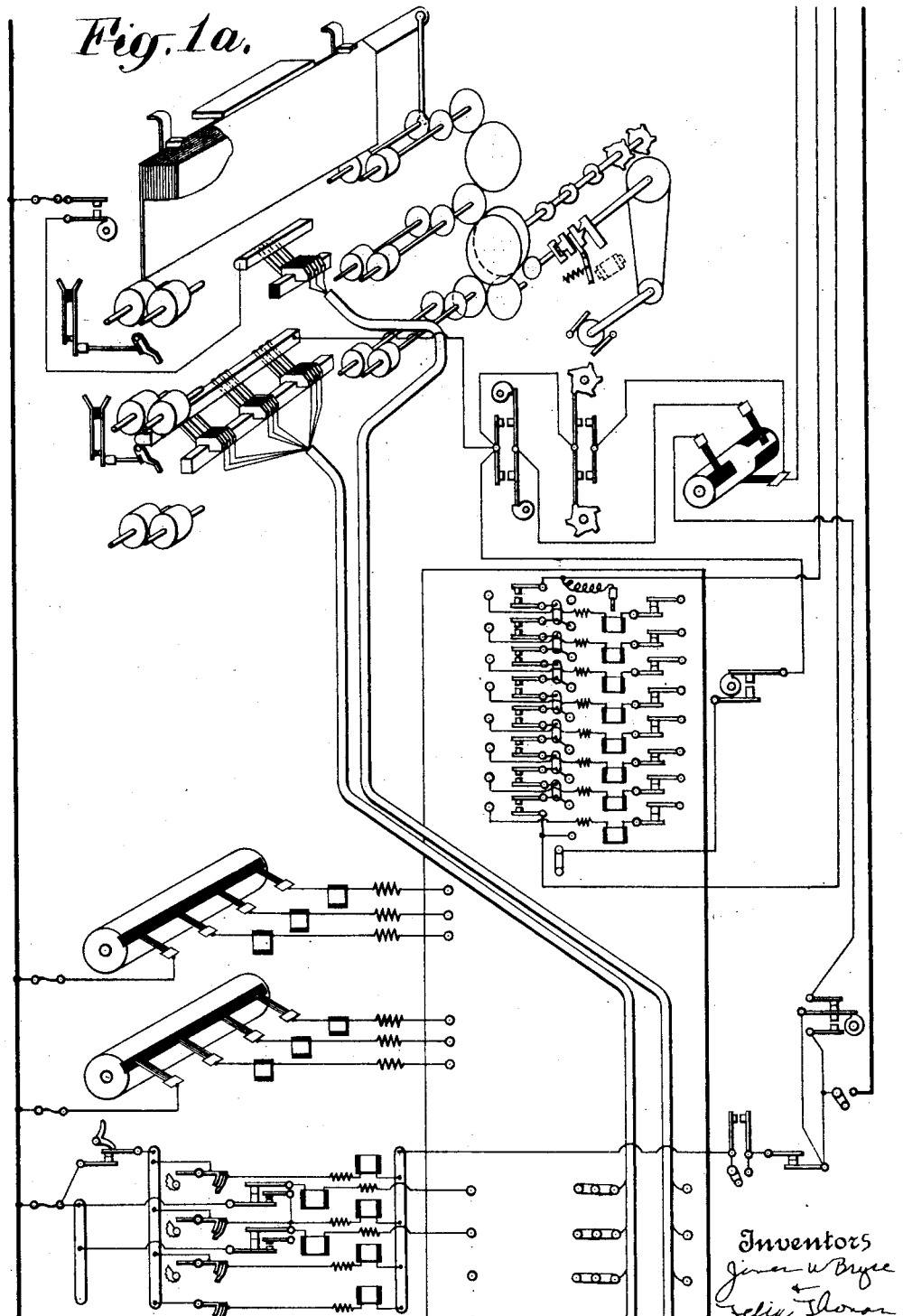

Referring to the drawings in more detail, in Fig. 2, 10 designates a set of time recording wheels provided with the usual transfer devices and arranged to print day of month, time of day (a. m. and p. m.) and year. These type wheels are driven in any suitable manner as by a ratchet and pawl device 11—12 (Fig. 3), the pawl being actuated by means of a magnet 13 and a suitable spring 14. The entire time stamp assembly 50 is mounted to swing upon arms 15 which are provided with a pivotal support at 16 so that the time wheels may be brought up in contact and engagement with the ribbon 17 so as to make a time impression 18 upon a ribbon sheet 19. It will be understood that the time imprint 18 is made at the time totals are printed upon the record sheet. In order to swing the time stamp assembly and take an impression from the time wheels thereof the magnet 20 is provided which through its core 21 draws down upon a toggle 22 and displaces the time stamp assembly to impression making position.

Referring to the circuit diagram, the time stamp magnet 13 which is the impulse magnet of the time stamp is shown in a circuit including wires 23, 24 and 25 in which circuit is provided a suitable source of current such as a battery 26. This circuit is periodically closed by cam operated contacts 27 on the clock unit 28. The closure of these contacts 27 advances the time wheels once each minute or at such other period as is desired. To control the making of an impression during the total printing cycle of the machine a cam designated P—a is provided on the shaft 30 of the tabulator. This shaft commonly known as the P shaft carries the usual cams P—l and is driven during the total print and reset cycle of the tabulator by the reset motor RM. Cam P—a through a suitable lever 32 is arranged to close contacts 33 at the proper time in the printing cycle of the machine to close a circuit 35 through the magnet 20 which swings the time stamp to impression making position.

The present machine also provides means whereby initiating of a total printing and reset cycle can be effected by means entirely independent of the tabulator. According to the present invention provision is made for utilizing the clock 28 for bringing about a total printing operation.

Referring to the circuit diagram (Fig. 1) contacts 48 are provided disposed in a circuit traced as follows: From battery 26, through wire 25, contacts 48, wire 36, magnet 37, switch 38 and back to other side of battery. Contacts 48 can be arranged to be operated at any desired intervals, for example, at ten second intervals. Assuming switch 38 closed these contacts 48 will periodically and at, say, ten second intervals energize magnet 37. It will be assumed that the tabulator has completed a registration of a group of cards and has stopped. During the tabulating operation contacts 39, in series with the reset motor RM, are held open, as usual in these machines, to prevent starting of the reset motor during tabulating operations. At the conclusion of tabulating on a group of cards, these contacts close, preparing the starting circuit of the reset motor. The mechanism for operating the contacts 39 is well known and illustrated diagrammatically in Fig. 6. A one revolution clutch is utilized to operate the card feed and printing and adding mechanisms during tabulating operations. This clutch is controlled by a hooked lever 60 which is pivoted at 61 and which carries armature 62 of the card feed clutch magnet 63. When magnet 63 is energized, as is the case during tabulating, lever 60 rocks about its pivot to lower its hooked end which thereupon releases the one revolution card feed clutch and causes the card feed and adding mechanisms to operate. At the end of tabulating when a total is to be taken, magnet 63 is deenergized and its hooked end rises to effect disengagement of the one revolution clutch. The contacts 39 are operated by an arm 64 fast on the shaft of the lever 60. The contacts tend to open due to their own resiliency but whenever lever 60 assumes the position shown in Fig. 6, or in other words whenever magnet 63 is deenergized, an insulating button 65 on arm 64 forces them into engagement. These mechanisms are well known in machines of this type and are fully described in the patent to Lake, No. 1,600,413, September 21, 1926. At this time binder post 4 will be alive, clutch magnet contacts 39 having been closed at the time the tabulator stopped registering. Then upon the energization of magnet 37 the armature 40 thereof will be attracted drawing a pawl 41 to the right (Fig. 4), rocking a bell crank 42 anticlockwise about its pivot 43 and effecting a closure of contacts 44. The closure of these contacts will allow current to flow through a circuit 45, which flow of current initiates a total printing and resetting cycle of the tabulator in the manner customary in these machines. It will be noted that pawl 41 is arranged to extend into cooperation with the cam designated P—b on the P shaft 30. The purpose of this construction is to provide means for releasing latch or pawl 41 from the armature 40 upon the making of a total printing and resetting cycle of the tabulating machine. In this way repeated total printing operations are prevented. It will be understood that if this device was not provided the machine would continue to take totals and perform repeated reset operations so long as contacts 48 remained closed. It will be understood that as soon as 41 is disengaged from 40 that spring 46 will rock bell crank 42 clockwise opening contacts 44. Upon the deenergization of magnet 37 and upon the opening of contacts 48 a spring 47 will retract armature 40 to its left hand position as shown in Fig. 4. The switch 38 is normally closed when the clock 28 is to control the taking of totals. If it is desired to prevent the clock initiating the taking of totals this switch is opened.

No further description of the circuit diagram is necessary inasmuch as the circuit diagram in all other respects is shown and described in the application of George F. Daly and Ralph E. Page, Serial No. 6,980, filed February 5, 1925.

What we claim is:—

1. In combination, an accounting machine comprising accumulating devices with associated total taking mechanism, and means for preventing operation of the total taking mechanism during accumulating operations, and time controlled clock means including periodically operated mechanism for controlling said total taking mechanism to initiate total taking on the periodic operation subsequent to the termination of an accumulating operation and means for suppressing the control of the total taking mechanism by the periodically operating mechanism after a single total taking operation.

2. In combination, an accounting machine comprising accumulating devices with associated total taking mechanism and means for preventing operation of the total taking mechanism during accumulating operations, and time controlled clock means including periodically operated mechanism for controlling said total taking mechanism to initiate total taking on the periodic operation subsequent to the termination of an accumulating operation and means controlled by the total taking mechanism for suppressing the control of the total taking mechanism by the periodically operating mechanism after a single total taking operation.

3. In an accounting machine having accumulating means and total recording means controlled thereby to print amounts accumulated, in combination electrical operating means for said total recording means and a circuit for the same including a pair of series connected contact mechanisms, clock controlled means for effecting closure of one of said contact mechanisms periodically and means for maintaining the other of said contact mechanisms open during an accumulating operation and closing it at the termination thereof to effect automatic total recording within a predetermined time after the termination of an accumulating operation.

In testimony whereof we hereto affix our signatures.

JAMES W. BRYCE.
FELIX THOMAS.